Nov. 3, 1959 L. L. POURCIAU 2,911,468

VIDEO RESOLUTION CONTROL

Filed Jan. 24, 1958

INVENTOR.
Louis L. Pourciau

BY H. A. Mackey

ATTORNEY.

United States Patent Office 2,911,468

Patented Nov. 3, 1959

2,911,468

VIDEO RESOLUTION CONTROL

Louis L. Pourciau, Pleasantville, N.Y., assignor to General Precision Laboratory Incorporated, a corporation of New York Application January 24, 1958, Serial No. 711,105

3 Claims. (Cl. 178—7.1)

Figure 1:
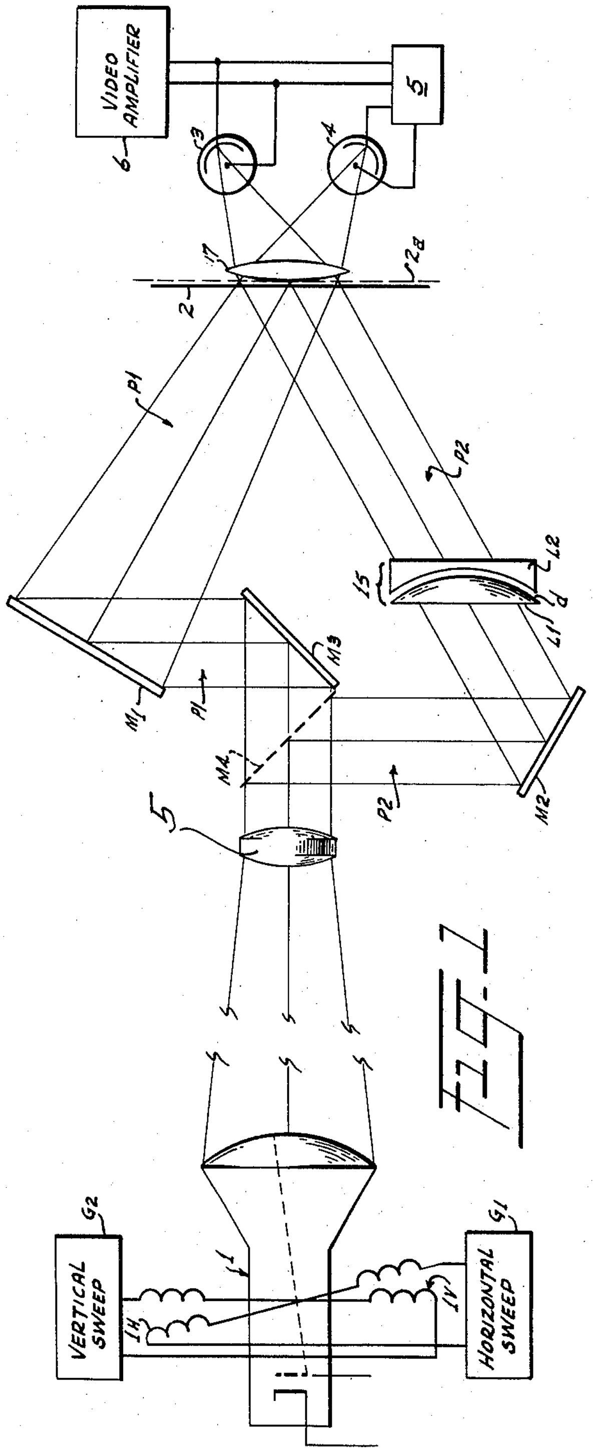

This invention relates to an electrical image-producing system and is particularly directed to a system for controlling the transfer characteristic of a film-to-video system.

This application is a continuation in part of application Serial No. 367,443 filed July 13, 1953 in the name of Louis L. Pourciau, now abandoned.

In any video or motion picture system it is highly desirable to produce a sensation in the human eye which approaches as near as possible the sensation that would be produced in the eye if the eye were viewing the original scene directly. There are many factors which must bear the proper relation to each other in order to simulate direct vision. For instance, the highlights and shadows of all of the areas of the scene should have the same relation as they do in the natural scene.

In a film-to-video system the transfer characteristics of many elements, such as the motion picture camera, the video camera pick-up tube, the photographic process, the kinescope tube, and the electrical circuits for converting the photographed image into the video image affect the final result. Although it it true that the transfer characteristics of some of these elements depart from linearity in such a manner as to at least partially compensate for the departure of the characteristics of other elements from linearity, there usually remains a net overall departure from linearity for the system as a whole. The degradation of the quality appears as loss of detail, compression of the highlights and shadows, increased fluctuating noise and spurious signals showing up as shading, edge flare, spots and halo.

It should be obvious that fine detail in the video system is represented by the high modulation frequencies supplied to the electron beam of the video tube. Thus it would seem possible that loss of detail might be corrected electrically by "high-peaking" circuits. However, in a video system such "high-peaking" circuits affect only the horizontal resolution and therefore produce an image which resembles that produced by an astigmatic lens. Therefore, it is necessary to provide some means for providing a corresponding change in the vertical detail.

The present invention provides a system for the production of a video signal which adequately simulates the appropriate correction necessary to reduce tonal range in high-contrast prints without seriously impairing the detail contrast. The effect is to reduce the large area contrast between the highlights and shadow areas while emphasizing or retaining the detail contrast. This is accomplished by simulating a defocused negative photographic image without requiring the use of such photographic image and converting the simulated image to electrical signals which when combined with signals representing a sharply focused image will produce a composite signal representing the proper "natural" balance between the horizontal and vertical resolution.

For reasons of simplicity and clarity the invention is described in connection with a film-to-video system where the image-bearing rays are projected from a film transparency but it will be obvious that the principles of the invention may be employed with an opaque picture-bearing medium where the image-bearing rays are reflected from the picture.

In one prior proposed solution, photographic area masking has been utilized in which a defocused negative image is superimposed over a positive transparency to control the final reproduction. The disadvantage of this method is that it requires the additional negative transparency.

In another proposed system electrical area masking is accomplished by processing a special film strip in which an out-of-focus image on the kinescope tube is utilized to control the gain of the video amplifier supplying the kinescope tube. The disadvantage of the latter proposal is that it requires the making of a special film strip to be used for video reproduction.

With the present invention, the conventional motion picture film may be used for video transmission.

The primary object of the present invention is to provide an improved means and method for controlling the video resolution of an electrical image reproducing system.

Another object is to provide an improved means for controlling the transfer characteristics of a film-to-video system.

Another object is to provide a system for compensating for loss in detail suffered by video signals in a film-to-video chain.

Figure 2:
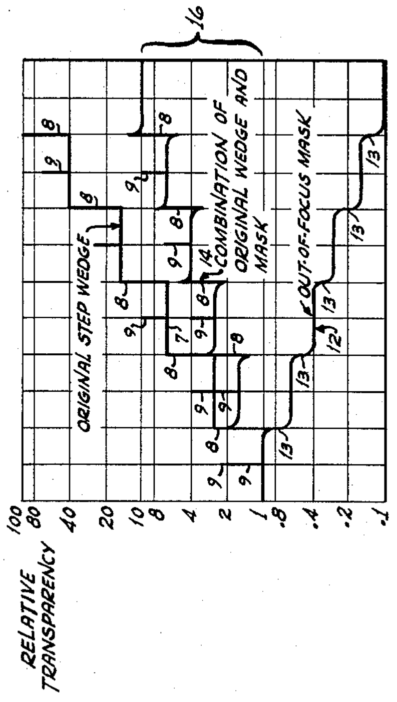

Other and further objects will become readily apparent to those skilled in the art from the following description when considered in connection with accompanying drawings in which:

Figure 1 is a schematic illustration of apparatus for carrying out the inventive concept; and Figure 2 is a graphical explanation of the invention.

The invention is illustrated in connection with video apparatus where a flying spot scanner tube 1 is used to provide a scanning spot of light on a conventional motion picture film strip 2. The flying spot scanner tube 1 is of conventional construction, being a cathode ray tube having a fluorescent face and horizontal and vertical scanning means such as a pair of horizontal deflection coils 1–H and vertical deflecting coils 1–V, respectively. The horizontal and vertical deflection coils are adapted to be energized by sync pulses generated in the respective generators $G_1$ and $G_2$, respectively, to produce cyclical bi-dimensional scanning which is synchronized with video receivers in conventional manner. The light from the scanner tube 1 is directed through, and modulated by, the gradations of the transparency of the film strip and the modulated light falls on the photo-electric devices 3 and 4, the combined outputs of which are amplified in a conventional video amplifier 6. A phase-inverting amplifier stage 5 of substantially unity gain is interposed between the photo-electric device 4 and the amplifier 6 for a reason hereinafter apparent.

The light from the flying spot scanner 1 is divided between two light paths $P_1$ and $P_2$ by means of a beam splitter arrangement. Although any conventional beam splitter could be used, because the front face of the flying spot scanner is not a point source of light, a condensing lens 5 is used to direct the light rays to a beam splitter arrangement comprising opaque reflecting mirrors $M_1$, $M_2$, $M_3$ and the semi-transparent mirror $M_4$. The mirror $M_4$ divides the rays from the lens 1 between the light paths $P_1$ and $P_2$. The rays that pass through the semi-transparent mirror $M_4$ constitute path $P_1$ and are reflected by the mirror $M_3$ to the mirror $M_1$ which directs the light through the film strip 2, and a condensing lens 17 onto a photo-electric device 4. Similarly, the light reflected by the semi-transparent mirror 4 is directed against the mirror $M_2$ through a lens system 15, the film strip 2, and the condensing lens 17 onto a photo-electric device 3. The purpose of the lens system 15 is to focus the light rays in path $P_1$ in a plane slightly displaced from the plane of focus of the light rays in path $P_2$. The plane of the focus of the light in path $P_2$ preferably coincides with the plane of the film strip 2 while the focus of the rays of light in path $P_1$ may be in a plane *2a*. As will be explained later, the light energy in path $P_2$ represents a sharply focused image while that of the light path $P_1$ represents an unsharply focused image.

The tonal range of an image-producing means may be illustrated by a curve made of a series of step wedges showing the relation between maximum and minimum brightness of which the system is capable. Such a curve is the stepped curve 7 of Fig. 2.

An analysis of the characteristics of video systems has shown that the loss in resolution may be considered as an aperture loss which is basically the same as that which occurs in optical sound recording on a photographic film when using a narrow slit. The effect may be illustrated by the simple case of a uniform rectangular aperture travelling across an area consisting of alternate black and white lines. The details of the shading, which as in the case of higher sound frequencies, will be lost as the white lines become wider and the peak-to-peak ratio drops rapidly when the width of the white lines becomes less than the scanning apertures. This peak-to-peak ratio approaches zero as the white line width approaches one-half of the aperture width.

It has been known heretofore that by a process known as "area masking" the tonal range in high contrast prints can be reduced without reducing the fine detail. In this process, by using a positive transparency of low contrast superimposed on a negative from which the transparency is made with the negative mask being out of focus, the large area contrast can be reduced without affecting the fine detail contrast. This may be more clearly represented by the graph of Figure 2 where the stepped curve 7 represents the complete tonal range of an image. This stepped curve 7 may be considered to consist of five equal logarithmic steps covering a total overall contrast range of 100:1. The fine detail of such an image is represented by the edges 8 and the fine lines 9 in the center of each step. An unsharp image of the mask is represented by the curve 12 as having an overall contrast range of 10:1. The edges are reproduced by gradual transitions represented by the sloped portions 13 of the curve since the image is out of focus. On the other hand the fine detail in the center of the steps substantially disappears.

The combination of the tonal range of the transparency, represented by the curve 7, and the lower contrast of the mask represented by the curve 12, results in an image the tonal range of which is represented by the composite curve 14 which has an overall contrast range of 10:1 as indicated by the bracket 16. In this composite curve 14 it is to be noted that the contrast excursion at the edges 8 and the fine lines 9 in the center of the stepped curve remains unchanged. This is indicated in Fig. 2 by the numerals 8 and 9, respectively, which are used to indicate that the lengths of the edges and the fine lines in both curves 7 and 14 are the same. It is to be noted that in this figure the large area contrast excursion is represented by the distance between the centers of the steps and that this is one half of the contrast between successive steps as represented by the lengths of the edges 8 in curves 7 and 14. In other words, the large area contrast is reduced without affecting the fine detail which is represented by the height of the edges 8 and the height of the center lines 9.

The curve 14, Fig. 2, represents the complete tonal range of contrast of a composite print which may be used for a video reproduction. As has been previously mentioned, since the fine detail of a video image corresponds to the higher frequencies of the video signal, some of the fine detail will usually be lost in the electrical section of a video chain even if not lost in some of the other portions of the chain. It will be readily apparent that by a method such as that described, whereby at least either the large area contrast or the fine detail contrast can be varied without affecting the other, an opportunity is presented for producing the proper balance between the tonal ranges in order to maintain the "naturalness" or "crispness" of an image during the transmission through a film-to-video chain. However, the photographic method just described requires the production of an extra print and additional step in the photographic process and this is highly undesirable.

The present invention provides the same end result without the use of the extra print. Referring again to Fig. 1 since the light in the path $P_2$ is sharply focused on the film strip 2, the image-bearing rays projected therefrom will produce an image having the tonal range represented by the original stepped curve 7. The light in path $P_1$ is not sharply focused on film 2 and therefore image-bearing rays in this path projected from the film will be similar to an out-of-focus mask having the tonal range represented by the curve 12. The light of path $P_1$ is directed by the condenser lens 17 onto photoelectric device 4, the output of which is inverted in phase by the amplifier 5.

Since the light in path $P_1$ is not sharply focused on film 2 the output of photoelectric device 4 represents electrically a defocused image. On the other hand, the light of path $P_2$ is focused by the lens 17 on the photocell 3 and the output of the latter, electrically represents a sharply focused positive image. It should be noted that the curves of Fig. 2 represent light transparency and not the electrical output of the photocells 3 and 4. The difference of the outputs is obtained by inverting the phase of one, such as by the phase-inverting amplifier 5. The algebraic sum of the direct output from the photocell 3, and the phase-inverted output from photocell 4 electrically represents the light projected through a composite image transparency having the tonal contrast range represented by the composite curve 14 in Fig. 2.

The electrical output from the video amplifier 6 is supplied to the video chain and constitutes the video signal which may be used to modulate a video transmitter in a conventional manner.

In order to produce a condition in the light path $P_1$ so that the light represents the out-of-focus mask, while at the same time maintaining the proper registry of the electrical images, the optical system 15 comprises lens elements $L_1$ and $L_2$ the distance $d$ between which may be varied to change the effective focal length. In this manner sufficient spherical aberration is introduced to cause a sufficiently large circle of confusion with a negligible change in magnification of the image. Since the light rays over path $P_2$ are focused on the film strip 2, and adjustment of the lens system 15 to displace the focus of the latter in front or behind the plane of film strip 2 produces the composite optical effect represented by the composite curve 14.

It will be readily apparent that instead of the specific optical system 15 shown it is within the contemplation of the invention to use any equivalent system for varying the optical length of one of the light paths without substantially varying the magnification.

Instead of the optical system 15, other diffusing means may be employed for diffusing the light in one of the light paths between the scanner 1 and the motion picture film strip 2. For example, a diffusing screen or translucent element having a large number of light scatterers could be used.

From the foregoing it will be readily apparent that the present invention provides a novel system for varying the overall transfer characteristic for an electrical image-producing system and particularly a film-to-video system. The essence of the inventive concept is the simulation by electrical means of the tonal variation which may be produced by "area masking." The significant improvement resides in the fact that the horizontal and vertical resolution of the final video image is maintained in the proper balance in order to maintain naturalness of the video image.

What is claimed is:

1. In combination in an electrical image-producing system, a source of a scanning light beam, means for splitting said beam to form two simultaneous beams directed along separated paths, means for directing said beams on to a pictorial representation with the circle of least confusion of one beam substantially coinciding with the plane of said pictorial representation and the other displaced therefrom, in a plane parallel to said first plane so as to reduce the large area contrast without substantially reducing the fine detail image contrast means responsive to the light of the respective paths proceeding from the pictorial representation for generating video signals corresponding to the light gradations in the respective paths and means for shifting the phase of the video signals corresponding to the beam having its circle of least confusion shifted from the phase of the pictorial representation and additively combining said shifted signals and said other video signals to produce a composite output signal.

2. In combination in a film-to-video system, a motion picture film strip having successive picture frames from which images are to be projected, means including a scanning light beam for projection scanning of individual picture frames in successive lines of light of elemental width, means for dividing said beam between two separate paths through said film strip, means for focusing the light rays of one path substantially in the plane of said film strip, means interposed in the other of said light paths for variably displacing the focus of the light rays in the latter path, from the plane of said film strip, first photo-electric means responsive to the defocused light rays for producing an electronic signal, a phase shifter connected to said first photo-electric means to provide an electronic output which is an analogue of the negative of the defocused light rays, second photo-electric means responsive to the focused light rays to provide an electronic output which is an analogue of the focused light rays, and means connected to said phase shifter and said second photo-electric means for adding their outputs to provide an electronic signal which is an analogue of the images and in which the large area contrast is reduced without loss of contrast in the fine details.

3. In combination in a film-to-video system, a motion picture film strip having successive picture frames from which images are to be projected, means including a scanning light beam for projection scanning of individual picture frames in successive lines of light of elemental width, means for dividing said beam between two separate paths through said film strip, means for focusing the light rays of one path substantially in the plane of said film strip, means interposed in the other of said light paths for variably displacing the focus of the light rays in the latter path, from the plane of said film strip, first photo-eelctric means responsive to the defocused light rays for producing an electronic signal, a phase inverter connected to said first photo-electric means to provide an electronic output which is an analogue of the negative of the defocused light rays, second photo-electric means responsive to the focused light rays to provide an electronic output which is an analogue of the focused light rays and means connected to said phase inverter and said second photo-electric means for adding their outputs to provide a composite output video signal representing the instantaneous algebraic sum of the outputs of said first and second photo-electric means.

References Cited in the file of this patent

UNITED STATES PATENTS 1,954,969 Wallace ---------------- Apr. 17, 1934

FOREIGN PATENTS 511,089 Belgium --------------- May 15, 1952